US012565799B2

(12) United States Patent
Niegmann

(10) Patent No.: US 12,565,799 B2
(45) Date of Patent: Mar. 3, 2026

(54) ARRANGEMENT FOR ACCESS MEMBER, ACCESS MEMBER SYSTEM AND METHOD

(71) Applicant: ASSA ABLOY AB, Stockholm (SE)

(72) Inventor: Kaj Niegmann, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/719,295

(22) PCT Filed: Dec. 13, 2022

(86) PCT No.: PCT/EP2022/085605
§ 371 (c)(1),
(2) Date: Jun. 13, 2024

(87) PCT Pub. No.: WO2023/110860
PCT Pub. Date: Jun. 22, 2023

(65) Prior Publication Data

US 2025/0067105 A1 Feb. 27, 2025

(30) Foreign Application Priority Data

Dec. 16, 2021 (SE) .................................... 2151539-0

(51) Int. Cl.
*E05F 1/08* (2006.01)
*E05F 1/10* (2006.01)

(52) U.S. Cl.
CPC ....... *E05F 1/1025* (2013.01); *E05Y 2201/624* (2013.01); *E05Y 2201/638* (2013.01); *E05Y 2201/684* (2013.01)

(58) Field of Classification Search
CPC ....... E05F 3/00; E05F 3/02; E05F 3/04; E05F 3/102; E05F 3/104; E05F 3/10;
(Continued)

(56) References Cited

U.S. PATENT DOCUMENTS 4,658,468 A 4/1987 Tillmann et al.
5,337,448 A 8/1994 Brown
(Continued)

FOREIGN PATENT DOCUMENTS

CN 206487275 U * 9/2017
CN 108699878 B * 9/2021 ................ E05F 3/20
(Continued)

OTHER PUBLICATIONS

"PCT EP 2022085605 Written Opinion mailed Mar. 17, 2023", 9 pages.
(Continued)

*Primary Examiner* — Chuck Y Mah
(74) *Attorney, Agent, or Firm* — Schwegman Lundberg & Woessner, P.A.

(57) ABSTRACT

An arrangement for closing an access member rotatable relative to a frame about a hinge axis, the arrangement comprising a primary element for fixation to either the frame or the access member; a secondary element for fixation to the other of the frame and the access member; a connection device arranged between the primary element and the secondary element and engaging the secondary element; and a force device comprising a drive element rotatable about a pivot axis and engaging the connection device, the force device being arranged to force rotation of the connection device relative to the primary element about the pivot axis, wherein a position of the force device relative to the primary element is adjustable after fixation of the primary element and the secondary element to adjust a distance between the pivot axis and the hinge axis. An access member system and a method are also provided.

17 Claims, 8 Drawing Sheets

(58) Field of Classification Search

CPC ..... E05F 3/12; E05F 3/227; E05F 5/06; E05F 5/08; E05F 5/10; E05F 2003/228; E05F 1/1025; E05F 1/105; E05F 1/04; E05F 1/1041; E05F 1/1008; E05C 17/04; E05C 17/28; E05C 17/20; E05Y 2201/21; E05Y 2201/246; E05Y 2201/256; E05Y 2201/264; E05Y 2201/474; E05Y 2201/624; E05Y 2201/626; E05Y 2201/638; E05Y 2201/684; E05Y 2900/132

See application file for complete search history.

(56) References Cited

U.S. PATENT DOCUMENTS

| | | | | |
|---|---|---|---|---|
| 5,829,097 A * | 11/1998 | Toledo | E05F 3/104 16/56 |
| 10,801,242 B1 | 10/2020 | Dixon et al. | |
| 11,680,434 B1 * | 6/2023 | Marovets | E05F 5/10 16/53 |
| 2005/0125947 A1 * | 6/2005 | Kral | E05F 5/003 16/67 |
| 2016/0290026 A1 * | 10/2016 | Hoffman | E05F 3/227 |
| 2016/0369546 A1 | 12/2016 | Zasowski et al. | |
| 2017/0247922 A1 * | 8/2017 | Wang | E05F 3/02 |
| 2018/0298664 A1 * | 10/2018 | Sauter | E05F 5/027 |

FOREIGN PATENT DOCUMENTS

| | | | |
|---|---|---|---|
| DE | 8324639 | 4/1984 | |
| DE | 102011087695 A1 * | 6/2013 | E05F 5/08 |
| EP | 0146693 | 7/1985 | |
| GB | 918777 | 2/1963 | |
| JP | S62177880 U * | 11/1987 | |
| JP | H11190165 A * | 7/1999 | |
| JP | 2014159721 | 9/2014 | |
| JP | 2016075055 | 5/2016 | |
| WO | 2023110860 | 6/2023 | |

OTHER PUBLICATIONS

"PCT EP 2022085605 ISR mailed Mar. 17, 2023", 5 pages.

"PCT EP 2022085605 IPRP mailed Mar. 18, 2024", 31 pages.

"Appl No. 2151539-0 SE Final Notice and Search Report mailed Jul. 20, 2022", 31 pages.

"Appl No. 2151539-0 SE Intention to Grant mailed Sep. 20, 2022", 3 pages.

"PCT EP 2022085605 Written Opinion by IPEA mailed Jun. 7, 2023", 6 pages.

* cited by examiner

ARRANGEMENT FOR ACCESS MEMBER, ACCESS MEMBER SYSTEM AND METHOD

CROSS-REFERENCE TO RELATED APPLICATION(S)

This application is a national stage application under 35 U.S.C. § 371 of PCT Appl. No. PCT/EP2022/085605, titled "Arrangement for Access Member, Access Member System and Method," filed Dec. 13, 2022, which claims priority to Swedish Patent Appl. No. 2151539-0, filed Dec. 16, 2021, each of which is incorporated herein by reference in its entirety.

TECHNICAL FIELD

The present disclosure generally relates to arrangements for access members, such as door leaves. In particular, an arrangement for closing an access member rotatable relative to a frame, an access member system comprising such arrangement, and a method of installing such arrangement, are provided.

BACKGROUND

Door closers require relatively precise installation in order to ensure that angles and torques of the door closer are optimal during operation. One critical issue when installing a door closer to a door is to provide a correct distance between a hinge axis of a door leaf and a pivot axis of an arm of the door closer. Some manufacturers aim to address this issue by providing paper templates for the installers to use. An installer may use the paper template as a guide during installation for drilling holes to a frame and to the door leaf. This process is complicated an error prone. For example, the paper template may have to be folded and taped to the frame or door leaf, and the paper template may have to be adapted to the width of the door leaf. Moreover, some installers simply disregard the paper templates. As an alternative, mounting plates may be used to assist drilling. However, these mounting plates add costs and are often disregarded by the installers.

Once the holes have been drilled, the door closer can be secured to the frame and to the door leaf by threading screws through the drilled holes. Should the drilled holes be inaccurately positioned, the door closer may not function as desired. For example, the door closer may provide an erroneous torque on the door leaf. This may for example manifest in that the door closer doesn't provide enough closing force on the door leaf. The installer may therefore have to drill new holes.

SUMMARY

One object of the invention is to provide an improved arrangement for closing an access member.

A further object of the invention is to provide an improved access member system comprising such arrangement.

These objects are achieved by the arrangement according to appended claim 1 and the access member system according to appended claim 13.

The invention is based on the realization that by enabling a distance between a pivot axis of a door closer and a hinge axis to be adjusted after securing the door closer to a door and to a frame, installation of the door closer is greatly facilitated.

According to a first aspect, there is provided an arrangement for closing an access member rotatable relative to a frame about a hinge axis, the arrangement comprising a primary element for fixation to either the frame or the access member; a secondary element for fixation to the other of the frame and the access member; a connection device arranged between the primary element and the secondary element and engaging the secondary element; and a force device comprising a drive element rotatable about a pivot axis and engaging the connection device, the force device being arranged to force rotation of the connection device relative to the primary element about the pivot axis, wherein a position of the force device relative to the primary element is adjustable after fixation of the primary element and the secondary element to adjust a distance between the pivot axis and the hinge axis.

By enabling the distance to be adjusted after fixation of the primary element and the secondary element, installation of the arrangement is greatly facilitated. For example, tolerances of positions of drilled holes in the access member and the frame can be increased. An installer is thereby allowed to drill holes for fixing the primary element and the secondary element less accurately while still ensuring an accurate installation of the arrangement. This in turn enables a faster installation. Moreover, the operation of the arrangement is improved due to an accurate positioning of the pivot axis.

The arrangement also contributes to an increased flexibility since the adjustment of the position of the pivot axis can be made to accomplish different power levels of the arrangement for different door types. This in turn enables the arrangement to be mounted in the same way for doors of different widths. For example, the primary element may be mounted flush with an inside of a door reveal of the frame for doors of different widths. For wider doors, the distance between the pivot axis and the hinge axis can be increased by moving the force device. The primary element or the secondary element, forming part of the arrangement, can thus function as a mounting plate as mentioned above in the background section.

The force device may be slidable between different positions relative to the primary element, for example in a horizontal direction parallel with a top of the frame. The force device may be moved manually relative to the primary element.

In order to adjust the position of the force device relative to the primary element, the engagement between the drive element and the connection device may be temporarily released, for example manually.

The secondary element may have a length that is equal to or less than a length of the primary element. The length of the secondary element may be 50% to 100% of an inner width of the frame and/or 50% to 100% of the length of the primary element.

Throughout the present disclosure, the arrangement may be a door closer. The arrangement may alternatively be another type of door operating device comprising door closing functionality, such as a door operator.

The access member may be a door leaf or a window sash. The hinge axis may be vertical. The primary element may be configured to be fixed to the frame and the secondary element may be configured to be fixed to the access member, or vice versa. In any case, the fixation may be made by means of fasteners, such as screws.

The primary element and/or the secondary element may be made of metal. Alternatively, or in addition, the primary element and/or the secondary element may be elongated.

The force device may be referred to as a technology package or tech pack. The connection device may slidingly engage the secondary element.

The force device may be arranged inside the primary element. In this way, the primary element contributes to reducing noise from the force device.

The primary element may be tubular. The primary element may for example have a square or rectangular profile.

A length of the primary element may be adjustable such that the primary element can span an entire inner width of the frame. This facilitates mounting of the primary element in the frame and provides a concealed design. The length may for example be telescopically adjustable.

The force device may comprise a closing spring arranged to force rotation of the connection device relative to the primary element about the pivot axis. The closing spring may be a compression spring. The closing spring may be aligned with the primary element.

The force device, such as the drive element thereof, may comprise a cam. The force device may further comprise a roller engaging the cam. The roller may be forced against the cam by the closing spring.

The force device may further comprise a force device housing. The force device housing may be arranged inside the primary element. The force device housing may house the closing spring, the roller and the cam. The closing spring may be connected between the force device housing and the cam.

Alternatively, or in addition, the force device may comprise a shaft engaging the connection device, such as a spline shaft.

Alternatively, or in addition, the force device may comprise an electromagnetic generator arranged to be driven by rotation of the drive element to harvest electric energy. In this case, the force device may further comprise a transmission arranged to transmit a rotation of the drive element to a rotation of the generator, or vice versa if the generator is driven as a motor, e.g. to open the access member. The harvested electric energy may be used to provide various smart functions in the arrangement.

The force device may be arranged to be locked in each position, one at a time. The force device may for example be locked by a fastener, such as a screw, or by a spring biased lock pin. With this variant, the primary element does not necessarily have to provide a plurality of engageable features for defining discrete positions of the force device relative to the primary element.

The primary element may comprise an engageable structure having a plurality of engageable features, each defining a unique position for the force device. Each engageable feature may for example be a hole.

The primary element may comprise a first end and a second end. When the arrangement is installed, the first end may be closer to the hinge axis than the second end. In case the length of the primary element is adjustable such that the primary element can span the entire inner width of the frame, the engageable structure may be fixed with respect to the first end and the second end may be movable relative to the first end and to the engageable structure to adjust the length of the primary element. This variant greatly facilitates installation since the arrangement can be mounted at the same distance from the hinges of doors of different widths, and the distance between the pivot axis and the hinge axis can then be manually adjusted to provide an optimal performance of the arrangement for the specific door width.

The connection device may be detachably connected to the drive element.

The force device may selectively engage each of the engageable features, one at a time.

The arrangement may further comprise a damping material between the force device and the primary element. This contributes to reducing noise and vibration transmission from the force device. The damping material may be a viscoelastic material, such as a viscoelastic polymer.

The connection device may comprise a rigid arm. The connection device may for example comprise one or two rigid arms. In the latter case, the first arm and the second arm may be rotatably connected to each other. In any case, a first arm may be connected to the drive element.

The secondary element may comprise a rail. In this case, the connection device may comprise a slider slidable along the rail.

According to a second aspect, there is provided an access member system comprising the frame, the access member rotatable relative to the frame about the hinge axis and an arrangement according to the first aspect.

The primary element may be fixed to the frame. In this case, the secondary element is fixed to the access member. In case the access member is a door leaf, the primary element may be fixed to a door frame and the secondary element may be fixed to the door leaf.

According to a third aspect, there is provided a method of installing an arrangement for closing an access member rotatable relative to a frame about a hinge axis, the arrangement comprising primary element, a secondary element, a connection device arranged between the primary element and the secondary element and engaging the secondary element, and a force device comprising a drive element rotatable about a pivot axis and engaging the connection device, the force device being arranged to force rotation of the connection device relative to the primary element about the pivot axis, the method comprising fixing the primary element to either the frame or the access member; fixing the secondary element to the other of the frame and the access member; and adjusting, after the fixing of the primary element and the secondary element, a position of the force device relative to the primary element to adjust a distance between the pivot axis and the hinge axis. The arrangement in the third aspect may be of any type according to the first aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
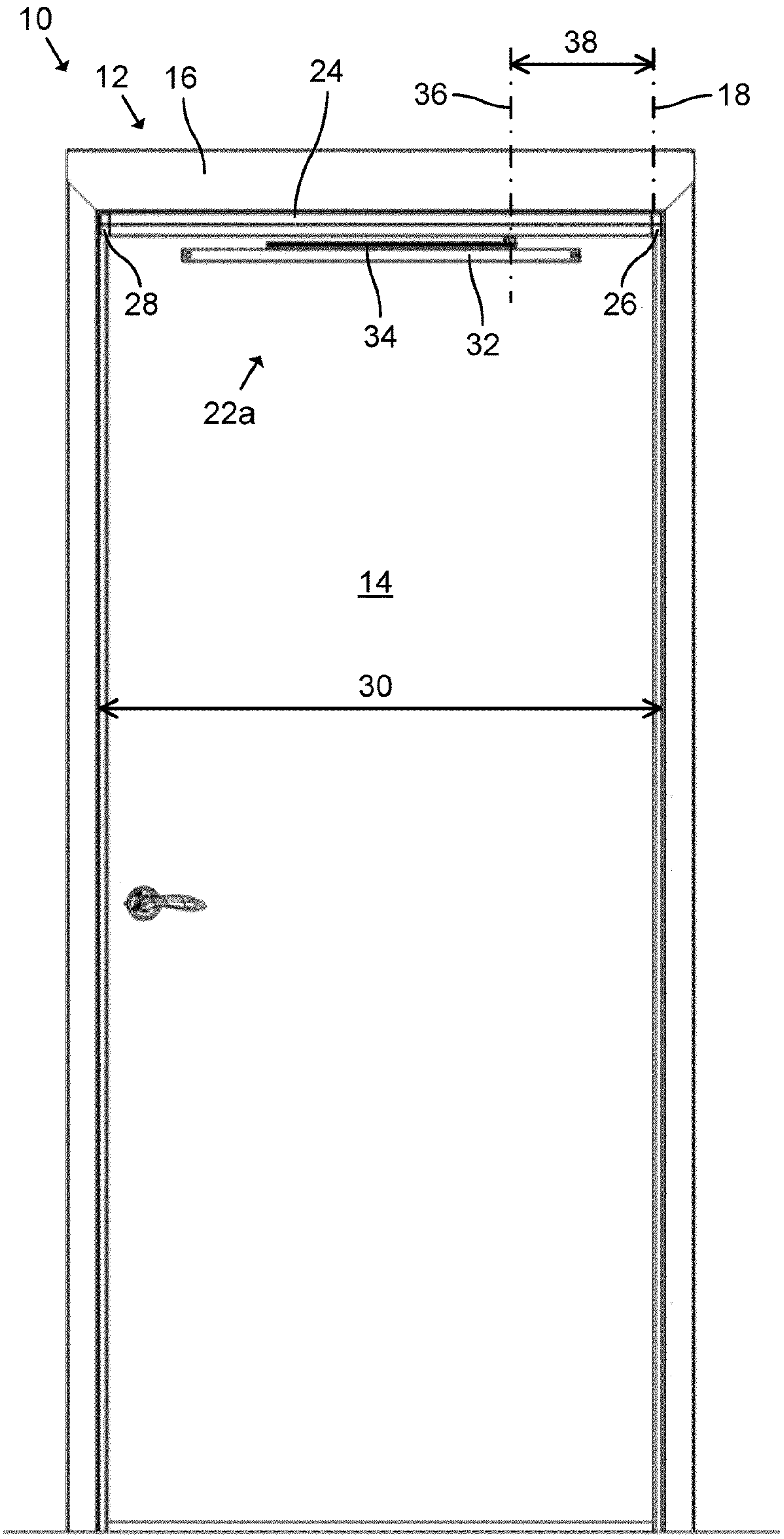
FIG. 1: schematically represents a front view of an access member system comprising an arrangement.

In the following, an arrangement for closing an access member rotatable relative to a frame, an access member system comprising such arrangement, and a method of installing such arrangement, will be described. The same or similar reference numerals will be used to denote the same or similar structural features.

Figure 2:
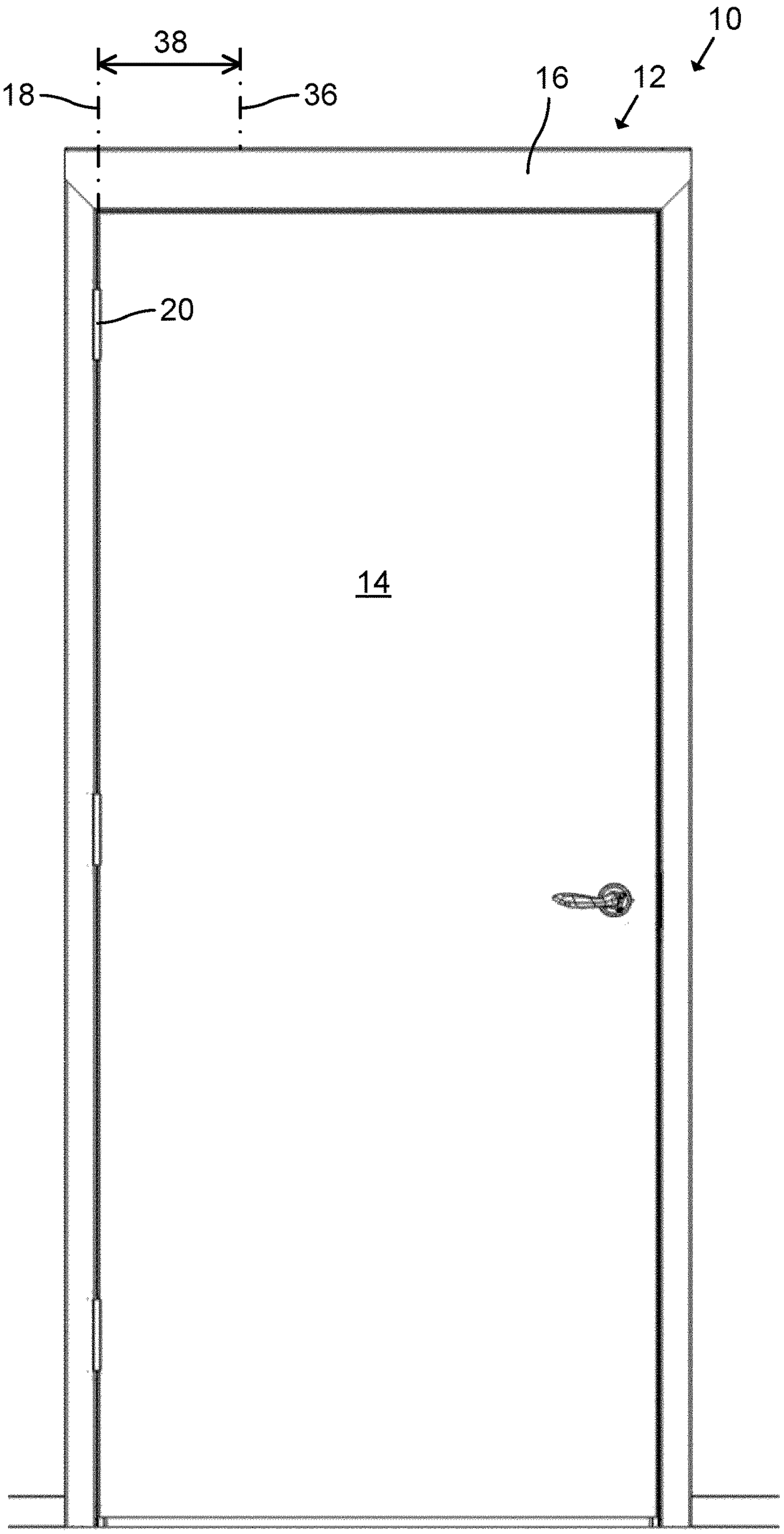
FIG. 2: schematically represents a rear view of the access member system.

FIG. 1 schematically represents a front view of an access member system 10, and FIG. 2 schematically represents a rear view of the access member system 10. With collective reference to FIGS. 1 and 2, the access member system 10 comprises a door 12. The door 12 comprises a door leaf 14 and a frame 16. The door leaf 14 is one example of an access member according to the present disclosure. The door leaf 14 is rotatable relative to the frame 16 about a vertical hinge axis 18. In this example, the door 12 comprises three hinges 20 as shown in FIG. 2.

The access member system 10 further comprises a door closer 22*a*. The door closer 22*a* is one example of an arrangement according to the present disclosure. The door closer 22*a* is configured to close the door leaf 14 from an open position to the illustrated closed position.

The door closer 22*a* comprises a primary element 24, here exemplified as a elongated, telescopic and hollow metal tube having a square cross section. In this example, the primary element 24 is fixed to the frame 16 in a horizontal orientation, e.g. by one or more screws (not shown). The primary element 24 comprises a first end 26 and a second end 28. The primary element 24 has been telescopically extended to span an entire inner width 30 of the frame 16. The first end 26 contacts an inside of a door reveal of the frame 16 closest to the hinge axis 18 (the right side in FIG. 1) and the second end 28 contacts an inner side of the frame 16 furthest away from the hinge axis 18 (the left side in FIG. 1).

The door closer 22*a* further comprises a secondary element 32. The secondary element 32 of this example is elongated and is fixed to the door leaf 14 in a horizontal orientation, e.g. by one or more screws (not shown). Also the secondary element 32 may be made of metal. A length of the secondary element 32 is approximately 70% of the extended length of the primary element 24 in this specific example.

The door closer 22*a* further comprises an arm 34. The arm 34 is one example of a connection device according to the present disclosure. The arm 34 of this example is straight and rigid. Moreover, the arm 34 is arranged between the primary element 24 and the secondary element 32. The arm 34 slidingly engages the secondary element 32. The arm 34 is rotatable relative to the primary element 24 about a vertical pivot axis 36. FIG. 1 shows a distance 38 between the hinge axis 18 and the pivot axis 36. The distance 38 is here a horizontal distance.

Figure 3:
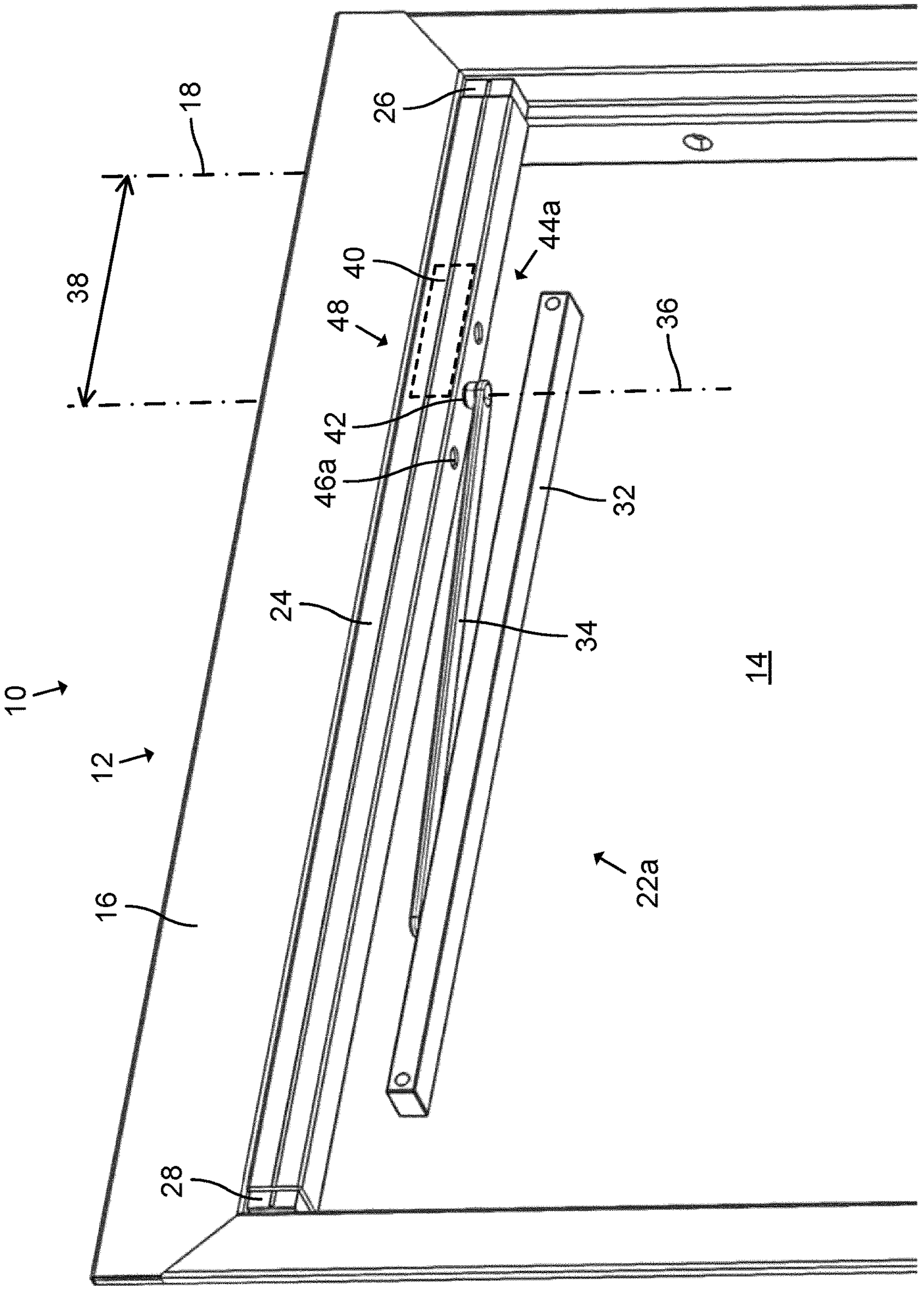
FIG. 3: schematically represents a partial perspective front view of the access member system.
Figure 4:
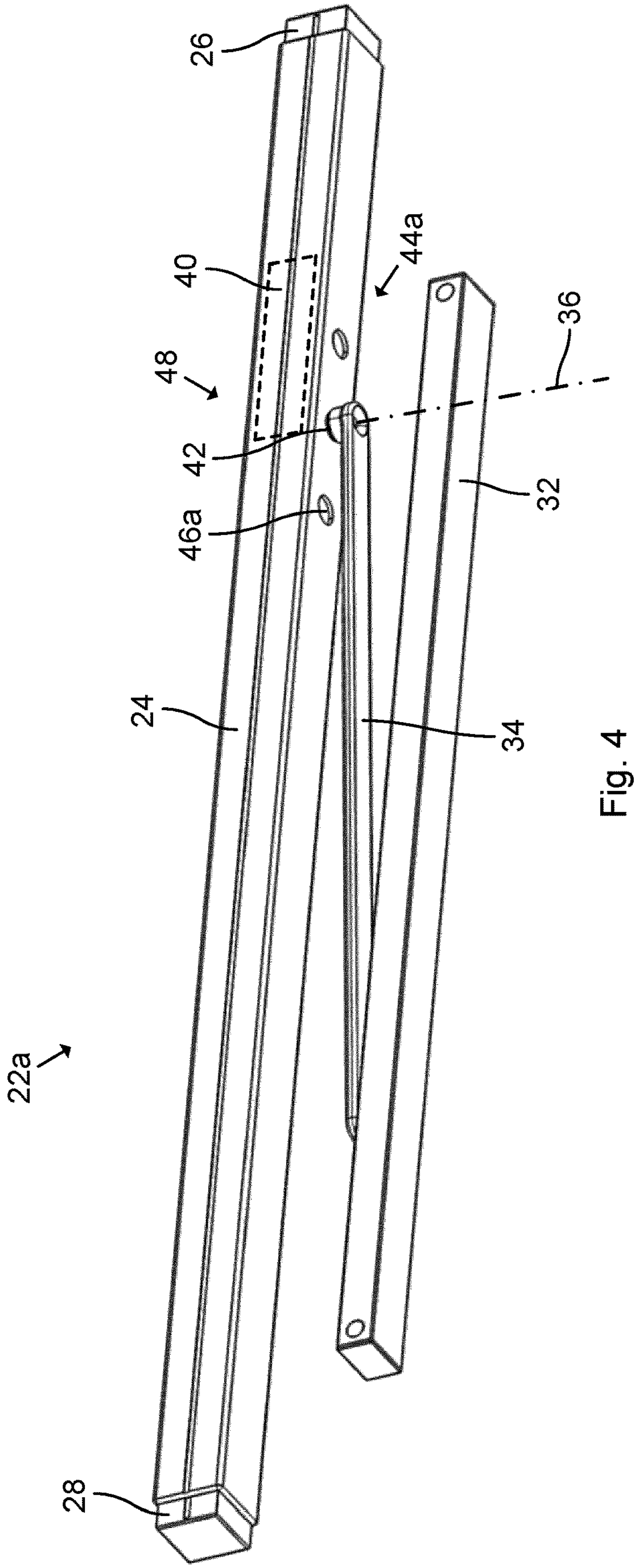
FIG. 4: schematically represents a perspective front view of the arrangement.

FIG. 3 schematically represents a partial perspective front view of the access member system 10, and FIG. 4 schematically represents a perspective front view of the door closer 22*a*. As shown in FIGS. 3 and 4, the door closer 22*a* further comprises a force device 40, here schematically shown with dashed lines. The force device 40 is arranged to force rotation of the arm 34 relative to the primary element 24 about the pivot axis 36 to effect closing of the door leaf 14. The force device 40 is arranged inside the primary element 24. Due to the arrangement of the force device 40 inside of the primary element 24, the door closer 22*a* has a concealed design.

The force device 40 comprises a drive element 42. The drive element 42 is rotatable about the pivot axis 36. The drive element 42 is connected to the arm 34. In this example, the drive element 42 protrudes outside of the primary element 24.

The door closer 22*a* comprises an engageable structure 44*a*. The engageable structure 44*a* of this example comprises a plurality of engageable holes 46*a* in the primary element 24, here three engageable holes 46*a*. The engageable holes 46*a* are arranged along a horizontal line spanning across the frame 16. The engageable holes 46*a* are examples of engageable features according to the present disclosure.

In FIGS. 3 and 4, the drive element 42 passes through the middle engageable hole 46*a*. The force device 40 is thus positioned in a position 48 where the pivot axis 36 is concentric with this engageable hole 46*a*.

The force device 40 can slide between different positions 48 relative to the primary element 24 while the primary element 24 remains fixed to the frame 16. The door closer 22*a* thereby enables the position 48 of the force device 40 to be adjusted after mounting of the door closer 22*a*. In this example, the force device 40 can be moved linearly within the primary element 24 such that the pivot axis 36 becomes aligned with any of the engageable holes 46*a* of the engageable structure 44*a* to provide an optimal positioning of the pivot axis 36 relative to the hinge axis 18. In this way, the distance 38 can be adjusted and an optimal performance of the door closer 22*a* can easily be obtained, even if the primary element 24 should be inaccurately mounted to the frame 16.

Figure 5:
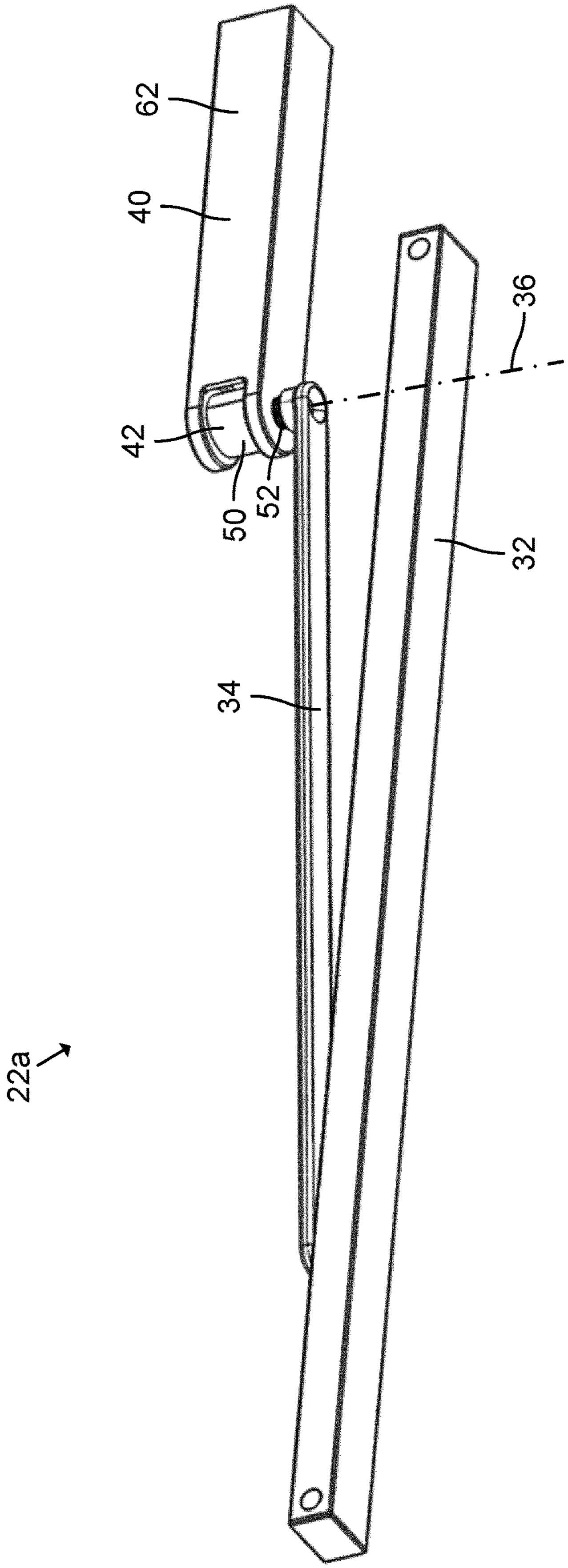
FIG. 5: schematically represents a partial perspective front view of the arrangement.

FIG. 5 schematically represents a partial perspective front view of the door closer 22*a*. In FIG. 5, the primary element 24 is removed to show the force device 40. The drive element 42 of this example comprises a cam 50. The cam 50 is concentric with the pivot axis 36.

The force device 40 further comprises a shaft 52, here exemplified as a spline shaft. The shaft 52 of this specific example can be retracted out from the cam 50 together with the arm 34 to release the spline engagement. Also the shaft 52 is concentric with the pivot axis 36.

Figure 6:
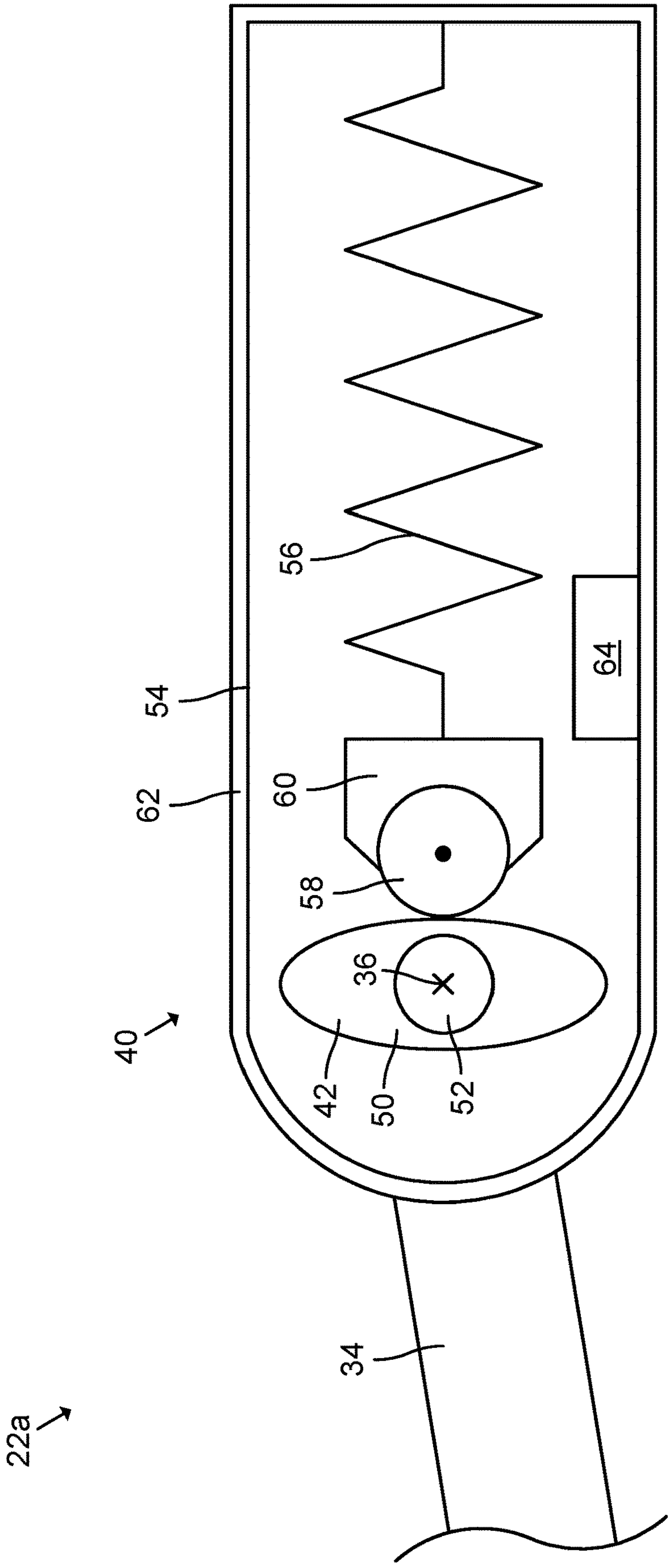
FIG. 6: schematically represents a top view of a force device of the arrangement.

FIG. 6 schematically represents a top view of the force device 40. The force device 40 shown in FIG. 6 is one of many examples of force devices according to the present disclosure. As shown, the force device 40 of this specific example comprises a force device housing 54. The force device 40 further comprises a closing spring 56, here exemplified as a compression spring. The closing spring 56 here extends along a longitudinal axis of the primary element 24. The closing spring 56 is arranged to force rotation of the drive element 42, and of the arm 34 connected thereto, relative to the primary element 24 about the pivot axis 36.

The force device 40 of this example further comprises a roller 58 and a roller support 60 rotatably supporting the roller 58. The roller 58 contacts the cam 50. The closing spring 56, the roller 58, the roller support 60 and the cam 50 are positioned inside the force device housing 54. One end of the closing spring 56 is connected to the force device housing 54 and an opposite end of the closing spring 56 is connected to the roller support 60. When the door leaf 14 is opened, the arm 34 rotates about the pivot axis 36. This causes rotation of the cam 50 and the roller 58 follows the cam 50 causing the closing spring 56 to be compressed.

The force device 40 of this example further comprises a damping material 62, here exemplified as a viscoelastic polymer. The damping material 62 is here arranged on the exterior of the force device housing 54. In this way, transmission of noise and vibrations from the force device 40 to the primary element 24 can be efficiently reduced.

The force device 40 of this example further comprises a magnet 64. In this example, also the magnet 64 is arranged inside the force device housing 54.

Figure 7:
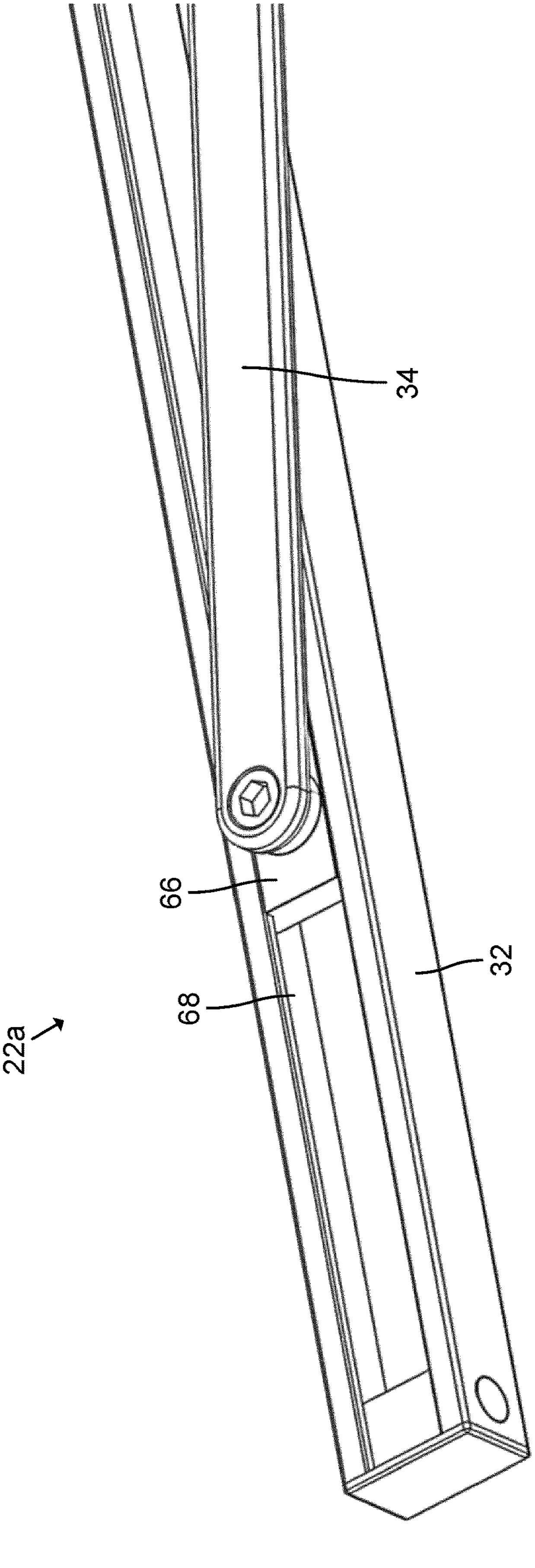
FIG. 7: schematically represents a perspective top view of a secondary element of the arrangement.

FIG. 7 schematically represents a perspective top view of the secondary element 32. As shown, the door closer 22*a* further comprises a slider 66 rotatably connected at an end of the arm 34. The slider 66 slidingly engages a rail 68 in the secondary element 32.

In the following, one specific example among several examples of installing the door closer 22*a* will be described. The installer may mount the primary element 24 such that the first end 26 of the primary element 24 is aligned with an inner side of the door reveal of the frame 16 closest to the hinge axis 18. One or several holes may be drilled in the frame 16, such as in a the vertical top portion thereof, and one or more screws may be inserted in the holes to mount the primary element 24. The installer may then extend the primary element 24 such that the second end 28 meets the opposite inner side of the frame 16 furthest away from the hinge axis 18. The second end 28 may optionally be fixed in this extended position, for example with a screw. The installer may then fix the secondary element 32 to the door leaf 14, for example by drilling one or more holes in the door leaf 14 and inserting one or more screws therein.

The installer may then try opening the door leaf 14 and inspect the closing performance of the door closer 22*a*. If the installer is satisfied with the performance, nothing has to be done. However, in case the force device 40 comprises an electromagnetic generator arranged to electrically power an electric controller, the controller may be configured to calibrate torques and closing times of the door leaf 14 based on the position 48. The controller may inform the installer if concluding that the position 48 should be changed, for example via wireless communication with a mobile phone carried by the installer. In any case, should the performance be unsatisfactory, the installer may bend down the arm 34 slightly such that the shaft 52 is retracted from the cam 50. The installer may then use an external magnet (not shown) magnetically cooperating with the magnet 64 to move the force device 40 relative to the primary element 24 such that the force device 40 is moved to a different position 48 where the cam 50 is aligned with a different engageable hole 46*a*. The use of an external strong enough magnet reduces a risk for unauthorized tampering since it is unlikely that a vandal will carry such magnet. The compression of the closing spring 56 remains the same when the force device 40 is moved relative to the primary element 24.

The installer may then grab and move the arm 34 such that the arm 34 slides along the secondary element 32 and engage the shaft 52 with the cam 50 in the new position 48. In this way, the distance 38 can very easily be adjusted to provide an optimal performance of the door closer 22*a* for the specific type of door 12 after mounting of the primary element 24 and the secondary element 32, for example without needing to drill new holes. Thus, the door closer 22*a* is more forgiving to installers in terms of mounting accuracy.

Figure 8:
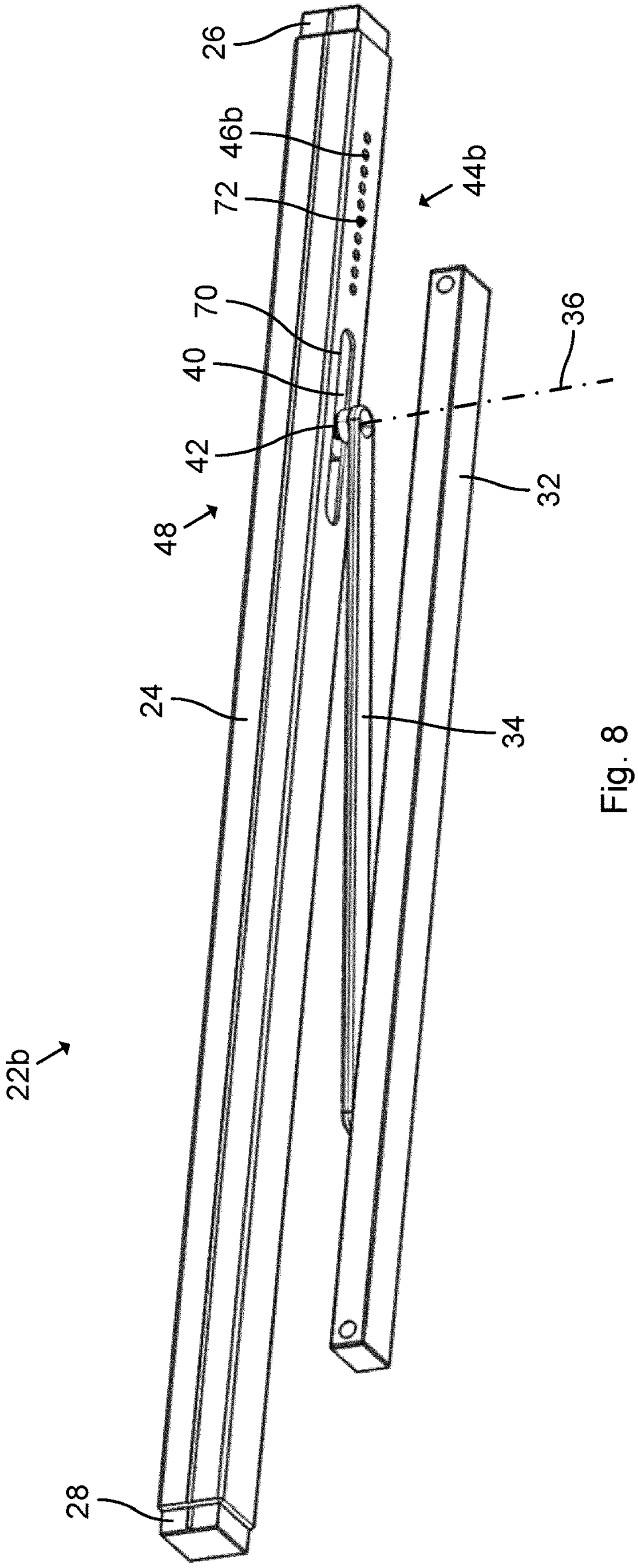
FIG. 8: schematically represents a perspective front view of a further example of an arrangement.

FIG. 8 schematically represents a perspective front view of a further example of a door closer 22*b*. The door closer 22*b* is a further example of an arrangement according to the present disclosure. Mainly differences with respect to the door closer 22 will be described. The door closer 22*b* comprises an engageable structure 44*b*. The engageable structure 44*b* comprises a plurality of engageable holes 46*b* in the primary element 24, here ten engageable holes 46*b*. The engageable holes 46*b* are further examples of engageable features according to the present disclosure.

The engageable structure 44*b* of this example further comprises an elongated slot 70 in the primary element 24. As shown, the drive element 42 engages the slot 70. The force device 40 of this example comprises a lock pin 72. As shown in FIG. 8, the lock pin 72 is received in one of the engageable holes 46*b*. By pushing the lock pin 72 into the primary element 24, for example with a tool, the position 48 of the force device 40 can be adjusted. The arm 34 provides a natural gripping interface for the installer. Once the lock pin 72 has been pushed into the primary element 24, the installer can grab and move the arm 34 to move the force device 40 relative to the primary element 24 to a new position 48.

When the force device 40 is in a desired position 48, the installer can let the lock pin 72 snap back into one of the holes 46*b* to lock the force device 40 in place. The lock pin 72 may be biased by a spring (not shown).

While the present disclosure has been described with reference to exemplary embodiments, it will be appreciated that the present invention is not limited to what has been described above. For example, the above two examples of adjusting the position 48 of the force device 40 relative to the primary element 24 are merely two of many examples. Accordingly, it is intended that the present invention may be limited only by the scope of the claims appended hereto.

The invention claimed is:

1. An arrangement for closing an access member rotatable relative to a frame about a hinge axis, the arrangement comprising:

a primary element for fixation to either the frame or the access member;

a secondary element for fixation to the other of the frame and the access member;

a connection device arranged between the primary element and the secondary element and engaging the secondary element; and a force device arranged inside the primary element and comprising a drive element rotatable about a pivot axis and engaging the connection device, the force device being arranged to force rotation of the connection device relative to the primary element about the pivot axis, wherein a position of the force device relative to the primary element is adjustable after the fixation of the primary element and the fixation of the secondary element to adjust a distance between the pivot axis and the hinge axis.

2. The arrangement according to claim 1, wherein the primary element is tubular.

3. The arrangement according to claim 1, wherein a length of the primary element is adjustable such that the primary element can span an entire inner width of the frame.

4. The arrangement according to claim 1, wherein the force device comprises a closing spring arranged to force rotation of the connection device relative to the primary element about the pivot axis.

5. The arrangement according to claim 1, wherein the force device is arranged to be locked in each of a plurality of adjusted positions, one at a time.

6. The arrangement according to claim 1, wherein the primary element comprises an engageable structure having a plurality of engageable features, each defining a unique position for the force device, the engageable features being engageable, one at a time, by the force device.

7. The arrangement according to claim 6, wherein the force device can selectively engage each of the engageable features, one at a time.

8. The arrangement according to claim 1, wherein the connection device is detachably connected to the drive element.

9. The arrangement according to claim 1, further comprising a damping material between the force device and the primary element.

10. The arrangement according to claim 1, wherein the connection device comprises a rigid arm.

11. The arrangement according to claim 1, wherein the secondary element comprises a rail, and wherein the connection device comprises a slider slidable along the rail.

12. An access member system comprising the frame, the access member rotatable relative to the frame about the hinge axis, and the arrangement according to claim 1.

13. The access member system according to claim 12, wherein the primary element is fixed to the frame.

14. An arrangement for closing an access member rotatable relative to a frame about a hinge axis, the arrangement comprising:

a primary element for fixation to either the frame or the access member, wherein a length of the primary element is adjustable such that the primary element can span an entire inner width of the frame;

a secondary element for fixation to the other of the frame and the access member;

a connection device arranged between the primary element and the secondary element and engaging the secondary element; and a force device comprising a drive element rotatable about a pivot axis and engaging the connection device, the force device being arranged to force rotation of the connection device relative to the primary element about the pivot axis, wherein a position of the force device relative to the primary element is adjustable after the fixation of the primary element and the fixation of the secondary element to adjust a distance between the pivot axis and the hinge axis.

15. The arrangement according to claim 14, wherein the primary element comprises an engageable structure having a plurality of engageable features, each defining a unique position for the force device, the engageable features being engageable, one at a time, by the force device.

16. The arrangement according to claim 15, wherein the primary element comprises a first end and a second end, wherein the engageable structure is fixed with respect to the first end, and wherein the second end is movable relative to the first end and to the engageable structure to adjust the length of the primary element.

17. An arrangement for closing an access member rotatable relative to a frame about a hinge axis, the arrangement comprising:

a primary element for fixation to either the frame or the access member;

a secondary element for fixation to the other of the frame and the access member;

a connection device arranged between the primary element and the secondary element and engaging the secondary element; and a force device comprising a drive element rotatable about a pivot axis and engaging the connection device, the force device being arranged to force rotation of the connection device relative to the primary element about the pivot axis, wherein a position of the force device relative to the primary element is adjustable after the fixation of the primary element and the fixation of the secondary element to adjust a distance between the pivot axis and the hinge axis, and wherein the force device is arranged to be locked in each of a plurality of adjusted positions, one at a time.

* * * * *